Figure 1:
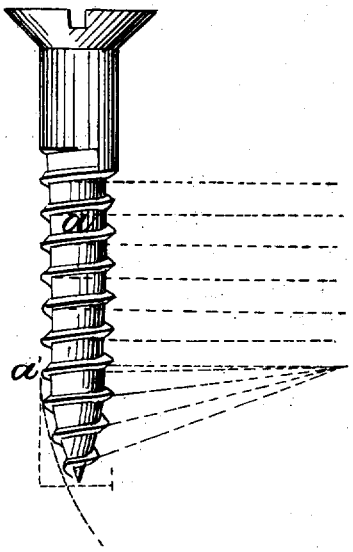
Figure 2:
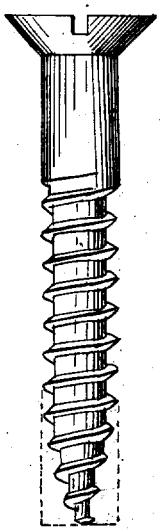

E. SAVAGE.

Wood Screw.

No. 827. Reissued Sept. 27, 1859.

Witnesses

J. P. Pirson

S. H. Maynard

Inventor

Elliot Savage

N. PETERS, Photo-Lithographer, Washington, D. C.

UNITED STATES PATENT OFFICE.

ELLIOT SAVAGE, OF BERLIN, CONNECTICUT, ASSIGNOR TO HIMSELF AND C. PARKER.

IMPROVEMENT IN MACHINES FOR THREADING SCREW-BLANKS.

Specification forming part of Letters Patent No. 11,974, dated November 21, 1854; Reissue No. 827, dated September 27, 1859.

*To all whom it may concern:*

Be it known that I, ELLIOT SAVAGE, of Berlin, in the county of Hartford and State of Connecticut, have invented a new and useful Improvement in Wood-Screws; and I do hereby declare that the following is a full, clear, and exact description of the same, reference being made to the annexed drawings, making a part of this specification, which is fully described, and referred to by letters herein.

My invention constitutes an improved manufacture of what is known as "wood-screws;" and it consists in giving to the point or entering end of the screw a novel form or shape, whereby the screw shall not only be capable of being driven into the wood with a minimum expenditure of power, and without previous boring, but shall also be less liable to split said wood as it enters.

Prior to the date of my invention the screw styled the "gimlet-pointed" was the only form which had been devised as an improvement upon the old blunt-ended screw, and although it possesses an advantage over that, in being capable of being driven without boring into soft woods, it has nearly the same tendency to split the wood. This arises from the fact that in forming the taper at the entering end the body or core is reduced in diameter by diminishing that of the successive portions between the threads, the outer line of each of which portions is parallel to the axis of rotation of the screw. An actual point cannot thus be made, the core being necessarily abruptly terminated. Such a screw is shown in Figure II, and from this it will clearly appear that as the point enters it exerts a lateral pressure only, tending, of course, to split apart the fibers of the wood. It is defective, therefore, in the particular, that it is not, in fact, a gimlet-pointed screw.

In my improved form the core is made to taper by having a conical or conoidal shape given to it, the outer lines of which, on any plane which passes through the axis of rotation, shall converge toward and, if produced, intersect said axis, a thread being, of course, made thereon. In Fig. I a screw is represented formed upon this principle, and its superiority is obvious from the fact that it can be made truly pointed, as well as that it has the easiest form for entering the wood, while, as it progresses, it partly pushes the fibers of the wood before it and partly spreads them laterally. They are consequently turned or bent over, and in this way partially double upon themselves; hence the liability to split the wood is materially reduced.

A screw of the form thus described may be produced in the following manner: A screw-blank of the ordinary cylindrical form is employed, and upon this a thread may be chased along the upper part, as at *a*, in the usual manner, the chasing-tool being held perpendicular to the axis of rotation of the screw. On arriving at the point *a'*, however, this position is to be changed by causing the chaser to be held at an angle to said axis. This angle should be changed as the chaser progresses toward the end of the blank, and thus it will terminate its thread exactly upon the axis and finish in a point.

I claim as an improved article of manufacture—

A wood-screw, of which the entering end is made to taper in the manner and for the purposes substantially as set forth—that is to say, by giving to the core thereof a form bounded, in any plane which passes through the axis of rotation, by lines which converge toward and, if produced, will intersect said axis, in contradistinction to the known form wherein the bounding-lines in such planes are parallel to said axis.

In witness whereof I have hereunto subscribed my name.

ELLIOT SAVAGE.

Witnesses:

J. P. PIRSSON,

S. H. MAYNARD.